(12) United States Patent
Baumoel

(10) Patent No.: US 7,643,947 B2
(45) Date of Patent: Jan. 5, 2010

(54) SYSTEM AND METHOD FOR FLOW PROFILE CALIBRATION CORRECTION FOR ULTRASONIC FLOWMETERS

(75) Inventor: Joseph Baumoel, Commack, NY (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 11/720,527

(22) PCT Filed: Dec. 2, 2005
(Under 37 CFR 1.47)

(86) PCT No.: PCT/US2005/043612

§ 371 (c)(1),
(2), (4) Date: Jul. 15, 2008

(87) PCT Pub. No.: WO2006/060650

PCT Pub. Date: Jun. 8, 2006

(65) Prior Publication Data

US 2009/0055119 A1   Feb. 26, 2009

(51) Int. Cl.
*G01F 25/00* (2006.01)
*G01F 1/20* (2006.01)

(52) U.S. Cl. ............ 702/45; 702/100; 73/861.26; 73/861.31

(58) Field of Classification Search ............ 702/45, 702/50, 100; 73/861.18, 861.23, 861.26, 73/861.31
See application file for complete search history.

(56) References Cited

U.S. PATENT DOCUMENTS

| | | | | |
|---|---|---|---|---|
| 3,817,098 | A * | 6/1974 | Brown | 73/861.28 |
| 4,300,400 | A * | 11/1981 | Bistrian et al. | 73/861.28 |
| 6,047,602 | A * | 4/2000 | Lynnworth | 73/632 |
| 6,877,387 | B1 * | 4/2005 | Certon et al. | 73/861.29 |

* cited by examiner

*Primary Examiner*—Bryan Bui
(74) *Attorney, Agent, or Firm*—Michael J. Wallace

(57) ABSTRACT

A method for calibrating a flowmeter, comprising choosing a pipe configuration from a list of pipe configurations, defining a number of diameters downstream from the pipe configuration where a transducer is to be installed, determining an initial curve number for the chosen pipe configuration, wherein the initial curve number corresponds to a predetermined flow profile correction curve, determining a swirl factor for the chosen pipe configuration, and computing a calibration factor for a given Reynolds number.

27 Claims, 5 Drawing Sheets

SYSTEM AND METHOD FOR FLOW PROFILE CALIBRATION CORRECTION FOR ULTRASONIC FLOWMETERS

BACKGROUND OF THE INVENTION

1. Technical Field

The present disclosure relates to a system and method for dynamically accounting for the effect of flow profile of fluid, such as gas or liquid, on the calibration of ultrasonic flowmeters in the region between any defined pipe configuration, and the downstream location at which the flow profile becomes fully developed. Based on this system and method, an accurate calibration factor can be determined so as to assure accurate flow measurement.

2. Discussion of Related Art

Clamp-on ultrasonic flowmeters, which are installed on pipes to measure fluid low, have been installed without pre-calibration, without flow conditioning and in locations of convenience or where no choice of location may be made. Known methods of mounting and clamping ultrasonic flowmeters to pipes are described, for example, in U.S. Pat. No. 4,425,803 to Baumoel, entitled "Transducer Structure And Mounting Arrangement For Transducer Structure For Clamp-On Ultrasonic Flowmeters"; U.S. Pat. No. 6,273,373 to Baumoel, entitled "Device for Clamping A Transducer to a Pipe," and U.S. Pat. No. 6,418,796 to Baumoel, entitled "Sonic Flow Measurement Apparatus For Tubes Including Sonically Matched Plates," which are commonly owned and incorporated herein by reference.

As fluid flow proceeds down a pipe, the effect of friction, or drag, of the pipe wall on the layers of fluid in contact with the wall, slows down the flow adjacent to the pipe wall relative to a higher flow rate at the center of the pipe. Thus, if allowed to flow for a given length, the shape of the flow profile will reach a condition where the relative flow across the diameter of the pipe will reach a fully developed shape that remains the same as flow proceeds further down the pipe. This shape is a function of the Reynolds number, which is based on velocity, viscosity and density of the fluid and characteristic dimension (e.g., pipe diameter). The fully developed shape is generally "pointier" for lower Reynolds numbers (e.g., a convex flow profile) and flatter for higher Reynolds numbers (e.g., a flat flow profile).

As a result of the difference in flow rates between the area near the pipe wall and the central portion of the pipe results, an improperly calibrated flowmeter outputs inaccurate flow measurements.

Under these circumstances, there is need to accommodate the effect of the local flow profile on meter calibration.

SUMMARY OF THE INVENTION

A method for calibrating a flowmeter, according to an embodiment of the present invention, comprises choosing a pipe configuration from a list of pipe configurations, defining a number of diameters downstream from the pipe configuration where a transducer is to be installed, and determining a number of diameters required to convert a fluid flow from a flat flow profile to a fully developed flow profile.

The step of determining may be performed according to the equation $y=4.3429 \text{ Ln}(x)+4E-14$, where $y$=the number of diameters to convert the fluid flow from the flat flow profile to the fully developed flow profile, and $x$=Reynolds number.

The method may further comprise determining an initial curve number for the chosen pipe configuration, wherein the initial curve number corresponds to a predetermined flow profile correction curve, and is determined from a list of pipe configurations including respective predetermined initial curve numbers assigned to each listed pipe configuration.

The method may further comprise determining a swirl factor for the chosen pipe configuration, and multiplying the swirl factor by the number of diameters required to convert the fluid flow from the flat flow profile to the fully developed flow profile, wherein the swirl factor is determined from a list of pipe configurations including respective swirl factors assigned to each listed pipe configuration.

The method may further comprise dividing the number of diameters downstream from the pipe configuration where the transducer is to be installed by the number of diameters required to convert the fluid flow from the flat flow profile to the fully developed flow profile, multiplying a result of the division by ten, and subtracting a result of the multiplication from the initial curve number. If the result of the subtraction is less than or equal to 0, a fully developed flow profile correction curve may be used to determine a calibration factor. If the result of the subtraction is greater than 0, the result of the subtraction may be divided by 10 to compute a computational factor, a calibration curve may be computed, and a calibration factor may be determined by finding a point on the calibration curve corresponding to a given Reynolds number. Computing the calibration curve may comprise (a) subtracting a value of a fully developed flow profile correction curve at a given Reynolds number from 1, (b) multiplying the difference by the computational factor and (c) adding the product to the value of the fully developed flow profile correction curve at the given Reynolds number, and repeating steps (a)-(c) for a plurality of Reynolds numbers.

A method for calibrating a flowmeter, according to another embodiment of the present invention, comprises choosing a pipe configuration from a list of pipe configurations, defining a number of diameters downstream from the pipe configuration where a transducer is to be installed, determining an initial curve number for the chosen pipe configuration, wherein the initial curve number corresponds to a predetermined flow profile correction curve, and determining a swirl factor for the chosen pipe configuration.

The method may further comprise computing a calibration factor for a given Reynolds number by implementing the following equation:

$$CF = \text{Base Comp} + (1 - \text{Base Comp}) * \text{Max}[0, IC - \text{Diameters}/(SF*(4.3429*LN(RN) + 0.00000000000004))*10]/10$$

wherein, CF is the calibration factor, Base Comp is a point on a fully developed flow profile correction curve for the given Reynolds Number (RN), IC is the initial curve number, SF is the swirl factor, Diameters is the number of diameters downstream from the pipe configuration where the transducer is to be installed, and Max [ . . . ] represents the maximum of the two parameters in the brackets, wherein the two parameters are 0 and $IC - \text{Diameters}/(SF*(4.3429*LN(RN) + 0.00000000000004))*10$.

A flowmeter may be calibrated according to the above methods.

In accordance with an embodiment of the present invention, a machine-readable medium has instructions stored thereon for execution by a processor to perform a method for calibrating a flowmeter, wherein the method comprises choosing a pipe configuration from a list of pipe configurations, defining a number of diameters downstream from the pipe configuration where a transducer is to be installed, and determining a number of diameters required to convert a fluid flow from a flat flow profile to a fully developed flow profile.

In accordance with another embodiment of the present invention, a machine-readable medium has instructions stored thereon for execution by a processor to perform a method for calibrating a flowmeter, wherein the method comprises choosing a pipe configuration from a list of pipe configurations, defining a number of diameters downstream from the pipe configuration where a transducer is to be installed, determining an initial curve number for the chosen pipe configuration, wherein the initial curve number corresponds to a predetermined flow profile correction curve, and determining a swirl factor for the chosen pipe configuration.

BRIEF DESCRIPTION OF THE DRAWINGS

Exemplary embodiments of the invention can be understood in more detail from the following descriptions taken in conjunction with the accompanying drawings in which.

DETAILED DESCRIPTION OF THE EXEMPLARY EMBODIMENTS

Figure 1:
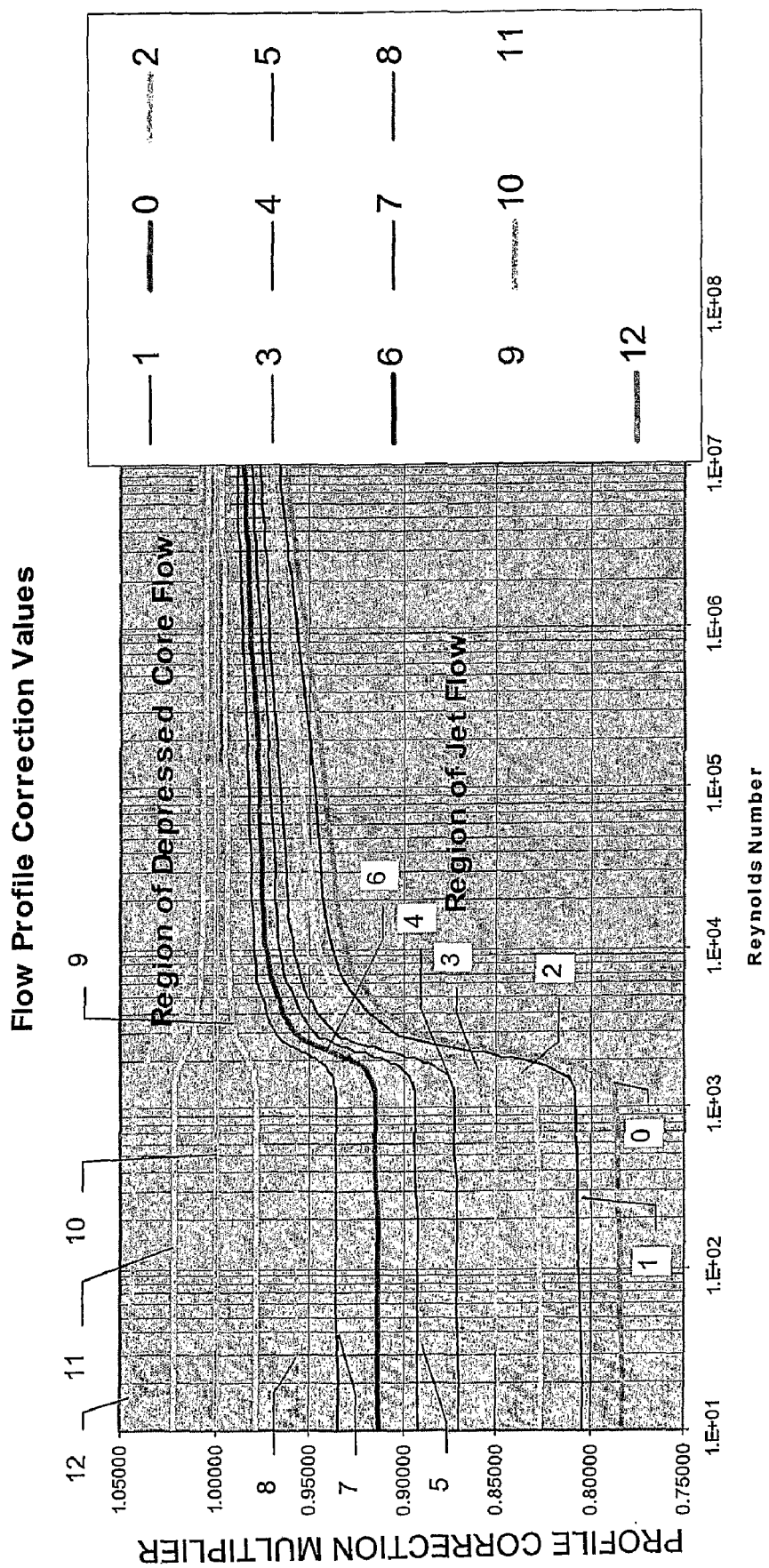
FIG. 1 shows a Flow Profile Calibration Chart, according to an embodiment of the present invention.

Exemplary embodiments of the present invention will be described below in more detail with reference to the accompanying drawings. This invention may, however, be embodied in different forms and should not be construed as limited to the embodiments set forth herein.

The embodiments described herein may be implemented in various forms of hardware, software, firmware, special purpose processors, or a combination thereof. For example, the embodiments described herein can be implemented in software as applications comprising program instructions that are tangibly embodied on one or more program storage devices (e.g., magnetic floppy disk, RAM, CD ROM, ROM and Flash memory), and executable by any device or machine comprising a suitable architecture. Further, since the constituent system modules and method steps described herein can be implemented in software, the actual connections between the system components (or the flow of process steps) may differ depending upon the manner in which the embodiments of the present invention are programmed. Given the teachings herein, one of ordinary skill in the related art will be able to contemplate these and similar implementations or configurations of the embodiments of the present invention.

An ultrasonic signal is transmitted between an upstream (with regard to the direction of fluid flow within the pipe) transducer and a downstream transducer. The time between transmission and reception of the ultrasonic signal is measured and the velocity of the fluid flow $V_F$ through the pipe can be determined by the equation $V_F = Kc(\Delta t/TL)$, wherein Kc is a dimensioned constant (vol/time) related to the pipe, ($\Delta t$) is the time difference between the upstream and downstream transit times, and TL is the average transit time through the fluid.

Accordingly, the time difference imposed on the passage of an ultrasonic beam is linearly proportional to flow rate. However, the volume of cylindrical flow for a given diameter is much greater near the pipe wall than near the center of the pipe for the same diameter. Accordingly, an uncompensated ultrasonic flowmeter operating diametrically will over-report flow due to having given equal weight to the small volume of flow near the center of the pipe and to the larger volume of flow near the pipe wall.

In addition, the particular pipe configuration through which the fluid is traveling, such as an elbow, reducer, and so on, affects the level of compensation required to avoid inaccurate reporting of flow. Therefore, when calibrating an ultrasonic flowmeter, the effect that a pipe configuration has on flow profile should be considered. One should take into account the dynamics of how the flow profile changes downstream from the pipe configuration, up to the point where the flow profile becomes fully developed.

Depending on the particular pipe configuration, at the anomaly, the profile can be flat, concave or convex, which depends on both the type of configuration and the current Reynolds number. The number of pipe diameters downstream from a particular pipe configuration (e.g., elbow) before the flow profile becomes fully developed is a function of the type of configuration and the current viscosity and Reynolds number.

In addition, certain other conditions, such as swirl, affect not only the flow profile at a given pipe configuration, but also affect the number of diameters of downstream flow before the flow profile becomes fully developed. Swirl is caused by an upstream disturbance, such as an elbow or a valve that creates an irregular flow profile. The presence of swirl increases the number of diameters needed to transition from a flat profile to a fully developed profile. Swirl factor is empirically determined based on pipe configuration and is a multiplying factor multiplied by the number diameters required to convert from a flat flow profile to a fully developed flow profile (see, e.g., Steps 105 and 106 in FIG. 4A).

Since there exist a number of scenarios where the installation of a clamp-on ultrasonic flowmeter will be in a region between an irregular pipe configuration and where fully developed flow profile is established, it is essential to understand and compensate for the dynamics of flow profile shape change in that region. Therefore, the disclosed system and method, in accordance with an illustrative embodiment, express the effect of the dynamically changing flow profile on the calibration of a clamp-on ultrasonic flowmeter in such a way as to automatically compensate for any flow profile induced error, taking into account Reynolds number, the type of anomalies encountered (e.g., pipe configuration, swirl), where on the pipe the transducers are to be located, and where the fully developed flow profile is established.

In accordance with an embodiment of the present invention, the method for accomplishing calibration correction includes the determination of a multiplication factor that either increases or decreases the calibration factor of a flowmeter to correct for error imposed by the flow profile. The following information is used to determine the multiplication factor:

1. A list of pipe configurations. The list preferably uses industry-recognized terminology so as to permit selection of a particular pipe configuration by one familiar with piping and instrumentation. In accordance with an embodiment of the present invention, a list of pipe configurations includes "straight run", "single elbow", "double elbow, conforming", "double elbow, opposing", "upstream valves", "pipe size expansion", "pipe size reduction", "normal entry", "header inlet", and "intrusive elements", for example, temperature probes.

2. The number of diameters downstream from the pipe configuration where the transducer(s) of the flowmeter is to be installed.

3. A list of the effect of each of these listed anomalies on the flow calibration at the point of the anomaly (see, e.g., Table 2).

4. An equation that defines the rate of change of calibration for each of these anomalies as a function of Reynolds number, including the effect of Swirl and other flow artifacts (see, e.g., equation (2) on page 10).

5. Reynolds number, which can be determined dynamically. Such a determination is included in the functionality of a clamp-on ultrasonic flowmeter, for example, Controlotron® Flowmeter Model No. 1010DB.

6. Swirl Factor, which, in accordance with an embodiment of the present invention, is a value that has been empirically determined based on pipe configuration. For example, the following Table 1 shows pipe configuration and the corresponding Swirl Factor.

TABLE 1

| Pipe Configuration | Swirl Factor |
| --- | --- |
| Straight Run | 1 |
| Single Elbow | 1.5 |
| Double elbow, conforming | 2.5 |
| Double elbow, opposing | 1.25 |
| Effect of upstream valves | 1.1 |
| Effect of pipe size (diameter) expansion | 1 |
| Effect of pipe size reduction | 1 |
| Effect of normal entry | 3 |
| Effect of header inlet | 1.1 |
| Effect of intrusive elements (e.g., temperature probes) | 1.05 |

Additional pipe configurations, for example, configurations taking into account the effect of various flow conditioners, and the corresponding swirl factor may be listed in Table 1.

The system and method, in accordance with an embodiment of the present invention, determine the calibration factor at any defined downstream location from any anomaly, at any given Reynolds number.

Referring to FIG. 1, a chart of flow profile correction values is shown, where the profile correction multiplier (y-axis) is plotted against Reynolds number (x-axis). The chart is the result of extensive empirical testing at different Reynolds numbers of fluid flowing through various pipe configurations. As shown in FIG. 1, the calibration correction for a fully developed flow profile is shown as curve 0 and the correction for flat flow profile as curve 10. The profile correction multiplier for curve 10 is 1.0000 for all Reynolds numbers, which means that no correction (1−1=0) is required for a flat profile since the volume of cylindrical flow for a given diameter is the same near the pipe wall and near the center of the pipe for the same diameter. Accordingly, no over-reporting of flow occurs. In contrast, the profile correction multiplier for curve 0 ranges from approximately 0.78000 to 0.96000 for all Reynolds numbers, which means that about −22% (0.78−1) to about −4% (0.96−1) correction of the flowmeter calibration must be performed for corresponding Reynolds numbers. In other words, the flowmeter calibration factor must be decreased in the range of about 4% to 22% depending on the Reynolds number (except for plug flow and convex flow profile). Correction must occur for curve 0 since the volume of cylindrical flow for a given diameter is much greater near the pipe wall than near the center of the pipe for the same diameter.

The curves from 1 to 9 are equally spaced at 10% intervals between curves 0 and 10 (i.e., 0 to 1=10%, 1 to 2=10%, 2 to 3=10% . . . 9 to 10=10% for a total of 100%). The Curves 11 and 12 are for concave flow profiles, ordinarily found past a double elbow pipe configuration out of plane and require positive correction. The region below curve 0 is for the jet flow condition that occurs, for example, just past orifice plates. The region above curve 12 is for depressed core flow that occurs, for example, after an elbow.

Figure 2:
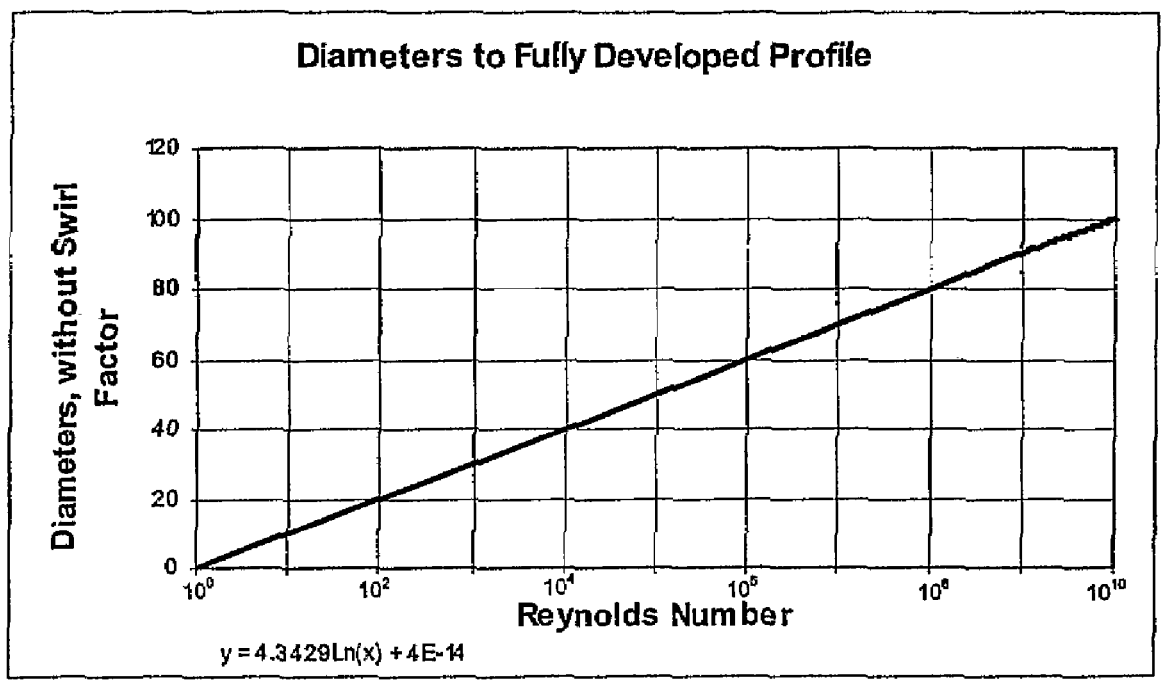
FIG. 2 shows a chart of Diameters to Fully Developed Flow Profile, as a function of Reynolds Number, according to an embodiment of the present invention.
Figure 4A:
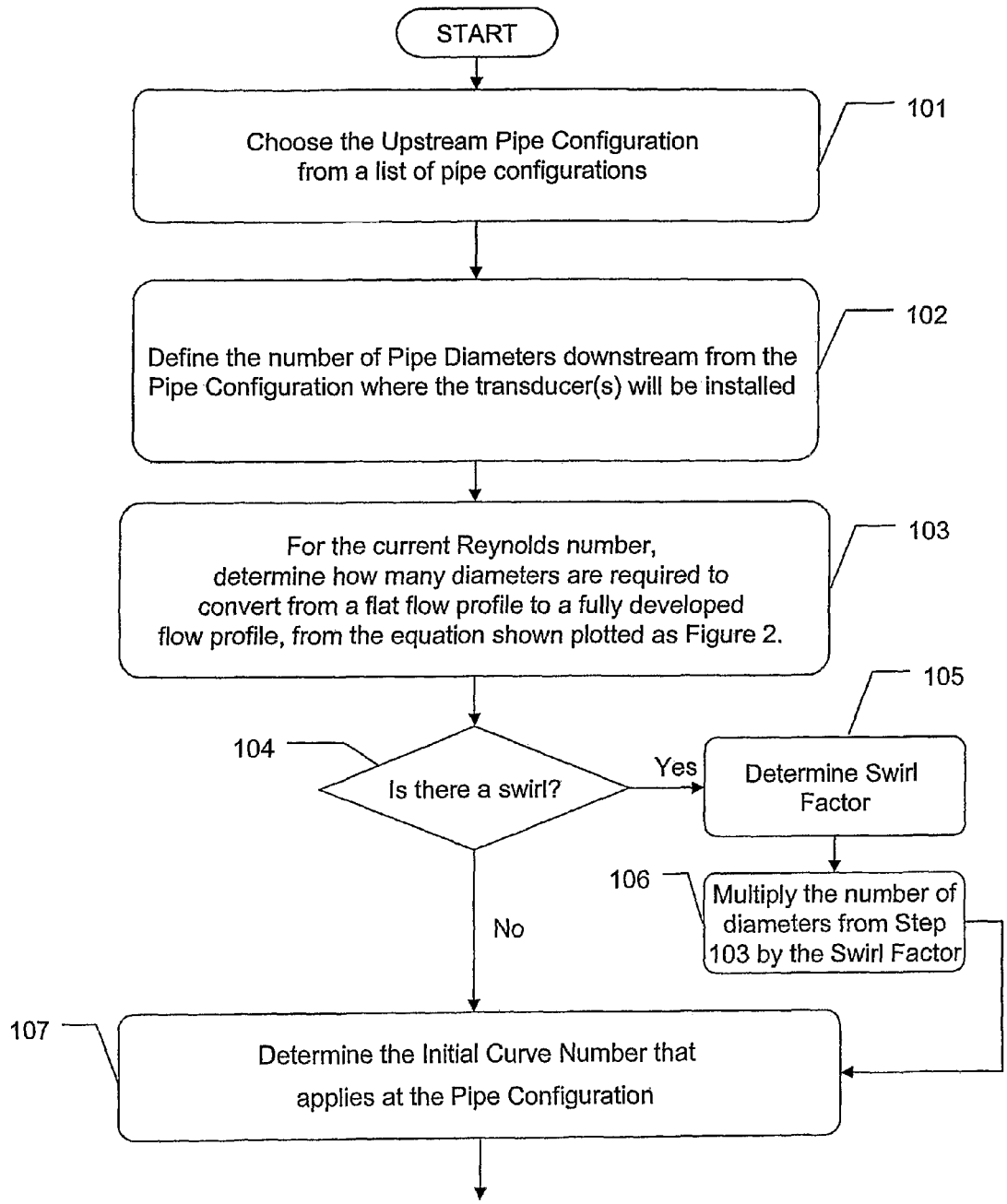
FIGS. 4A-4B illustrate a flow chart showing a method for flow profile calibration correction for ultrasonic flowmeters, according to an embodiment of the present invention.
Figure 4B:
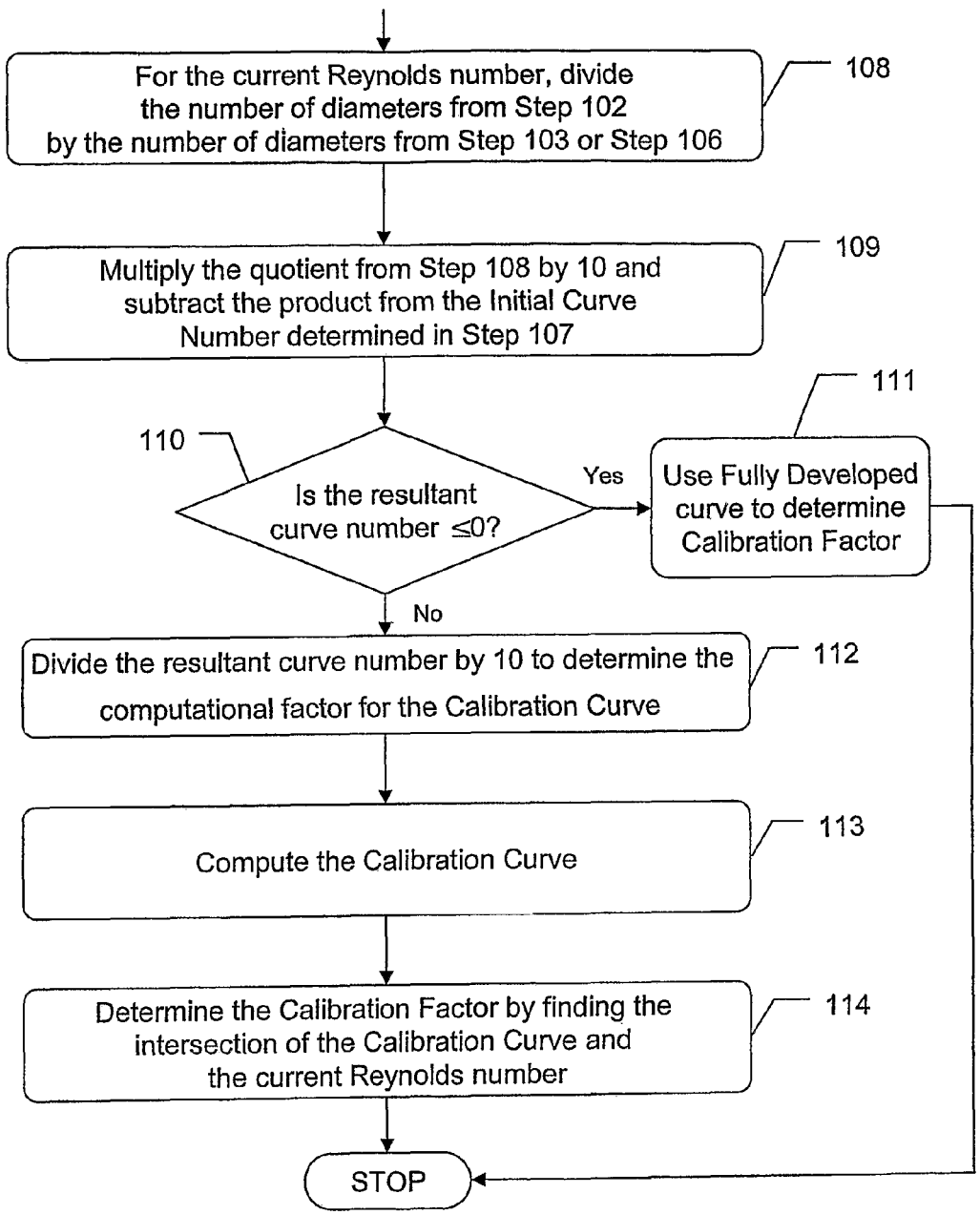

Referring to FIGS. 4A and 4B, a method for obtaining a flowmeter calibration factor includes choosing an upstream pipe configuration from a list of pipe configurations (Step 101), defining the number of pipe diameters downstream from that pipe configuration that the transducers/flowmeters will be installed (Step 102), and determining, for the current Reynolds number, how many diameters are required to convert from a flat flow profile to a fully developed flow profile (Step 103). This determination is made from reference to the plot of FIG. 2, which shows the number of diameters to reach a fully developed profile (y-axis) as a function of Reynolds number (x-axis). The chart represents the following equation (1):

$$y = 4.3429 \, \text{Ln}(x) + 4E - 14 \quad (1)$$

where y=the number of diameters, without Swirl Factor to reach a fully developed profile and x=Reynolds number. The value 4E−14 is part of equation (1) to prevent division by zero.

In Step 104, it is determined whether there is a swirl. If there is a swirl, the swirl factor is determined in Step 105 from a predetermined list, for example, the list shown in Table 1. In Step 106, the number of diameters determined in Step 103 is multiplied by the Swirl Factor and then the process proceeds to Step 107. If there is no swirl in Step 104, proceed directly to Step 107.

In Step 107, an initial curve number that applies at the pipe configuration is determined. Through experimentation, it has been determined that, for purposes of calculating the calibration factor, an initial curve number from FIG. 1 can be assigned to a particular pipe configuration in accordance with the following Table 2.

TABLE 2

| Pipe Configuration | Initial Curve Number |
| --- | --- |
| Straight Run | 1 |
| Single Elbow | 8 |
| Double elbow, conforming | 12 |
| Double elbow, opposing | 10 |
| Effect of upstream valves | 5 |
| Effect of pipe size (diameter) expansion | 3 |
| Effect of pipe size reduction | 8 |
| Effect of normal entry | 7 |
| Effect of header inlet | 7 |
| Effect of intrusive elements (e.g., temperature probes) | 3 |

As with Table 1, additional pipe configurations, for example, configurations taking into account the effect of various flow conditioners, and the corresponding initial curve number may be listed in Table 2.

In step 108, for the current Reynolds Number, the number of diameters downstream from the pipe configuration that the transducers/flowmeter are located (Step 102) is divided by the number of pipe diameters needed to convert from a flat to a fully developed flow profile (Step 103) or, if there is a Swirl Factor, divided by the number of pipe diameters needed to convert from a flat to a fully developed flow profile multiplied by the Swirl Factor (Step 106). In Step 109, the quotient from Step 108 is multiplied by 10 and the product is subtracted from the initial curve number determined in Step 107. This determines the actual curve number on which the calibration lies. In Step 110, if the resultant curve number is less than or equal to 0, proceed to Step 111 and use the fully developed curve 0 from FIG. 1 to determine the calibration factor at the current Reynolds number.

If the resultant curve number is greater than 0, proceed to Steps 112 and 113, wherein the resultant curve number is divided by 10 to determine the computational factor for the calibration curve, and the calibration curve is computed (Step 113). The calibration factor is then determined by finding the intersection of the calibration curve computed in Step 113 and the current Reynolds Number (Step 114).

Steps 101-114 are represented by the following equation (2):

Use Comp=Base Comp+(1−Base Comp)*Max [0,Initial Curve−Diameters/(Swirl Factor*(4.3429*LN(RN)+0.00000000000004))*10]/10, wherein, Base Comp is a point on the fully developed flow profile (Curve 0) for any given Reynolds Number (RN) and Use Comp is a point on the calibration curve for any given Reynolds Number (RN), when the initial curve number (Initial Curve) and Swirl Factor are determined from the pipe configuration, and the number of pipe diameters (Diameters) downstream from the pipe configuration where the transducer is to be installed is known. Max represents a function to determine the maximum of two parameters, wherein the two parameters are "0" and "Initial Curve−Diameters/(Swirl Factor*(4.3429*LN(RN)+0.00000000000004))*10". Note that equation (2) includes equation (1).

As an example, referring to equation (2) and FIGS. 4A-4B, if the pipe configuration is "double elbow, opposing" (Step 101), the initial curve number (Initial Curve) 10 is retrieved from Table 2 (Step 107) and the swirl factor 1.25 is retrieved from Table 1 (Steps 104-105). Further, if the number of pipe diameters (Diameters) downstream from the pipe configuration where the transducer is to be installed is 20 (Step 102), the calibration curve (Use Comp curve) can be computed for any given Reynolds Number (RN), as shown in Table 3 below (Step 113).

TABLE 3

| Index | Reynolds # | Base Comp | Use Comp |
|---|---|---|---|
| 1 | 1.00E+00 | 0.7808 | 0.7808 |
| 2 | 2.00E+00 | 0.7808 | 0.7808 |
| 3 | 4.00E+00 | 0.7808 | 0.7808 |
| 4 | 8.00E+00 | 0.7808 | 0.7808 |
| 5 | 1.60E+01 | 0.7808 | 0.7808 |
| 6 | 3.20E+01 | 0.7808 | 0.7808 |
| 7 | 6.40E+01 | 0.7808 | 0.8058 |
| 8 | 2.56E+02 | 0.7808 | 0.8544 |
| 9 | 1.28E+03 | 0.7869 | 0.8902 |
| 10 | 1.57E+03 | 0.7930 | 0.8963 |
| 11 | 1.69E+03 | 0.7991 | 0.9004 |
| 12 | 1.83E+03 | 0.8052 | 0.9045 |
| 13 | 1.93E+03 | 0.8113 | 0.9081 |
| 14 | 1.99E+03 | 0.8174 | 0.9114 |
| 15 | 2.04E+03 | 0.8234 | 0.9146 |
| 16 | 2.10E+03 | 0.8295 | 0.9179 |
| 17 | 2.17E+03 | 0.8356 | 0.9211 |
| 18 | 2.23E+03 | 0.8417 | 0.9243 |
| 19 | 2.29E+03 | 0.8478 | 0.9275 |
| 20 | 2.35E+03 | 0.8539 | 0.9306 |
| 21 | 2.41E+03 | 0.8600 | 0.9338 |
| 22 | 2.48E+03 | 0.8661 | 0.9369 |
| 23 | 2.56E+03 | 0.8722 | 0.9400 |

TABLE 3-continued

| Index | Reynolds # | Base Comp | Use Comp |
|---|---|---|---|
| 24 | 2.66E+03 | 0.8783 | 0.9431 |
| 25 | 2.76E+03 | 0.8844 | 0.9462 |
| 26 | 2.85E+03 | 0.8905 | 0.9493 |
| 27 | 3.08E+03 | 0.8965 | 0.9525 |
| 28 | 3.48E+03 | 0.9026 | 0.9560 |
| 29 | 4.01E+03 | 0.9087 | 0.9595 |
| 30 | 4.65E+03 | 0.9148 | 0.9628 |
| 31 | 5.68E+03 | 0.9209 | 0.9663 |
| 32 | 7.58E+03 | 0.9270 | 0.9699 |
| 33 | 1.33E+04 | 0.9331 | 0.9740 |
| 34 | 3.38E+04 | 0.9375 | 0.9779 |
| 35 | 9.74E+04 | 0.9420 | 0.9814 |
| 36 | 2.78E+05 | 0.9464 | 0.9842 |
| 37 | 7.79E+05 | 0.9508 | 0.9866 |
| 38 | 2.18E+06 | 0.9553 | 0.9887 |
| 39 | 6.06E+06 | 0.9597 | 0.9905 |
| 40 | 1.11E+08 | 0.9704 | 0.9941 |

For example, referring to equation (2), for the Reynolds Number of 1.99E+03 (Index 14), Steps 103 and 106 are performed by inserting 1.25 (Swirl Factor) and 1.99E+03 (RN) into Swirl Factor*(4.3429*LN(RN)+0.00000000000004). Then, Step 108 is performed, wherein 20 (Diameters) is divided by the result of Step 106. Next Step 109 performed, wherein the quotient from Step 108 is multiplied by 10 and the product subtracted from the initial curve number (Initial Curve), which is 10 in this example. Then Step 110 is performed, which is represented by the "Max" function in equation (2), to determine whether the result of Step 109 is greater than 0. If the result is less than or equal to 0, then a calibration curve is not computed and the fully developed curve (Curve 0) is used to determine the calibration factor. However, if the result is greater than or equal to 0, the result is divided by 10 to determine a computational factor for the calibration curve (Step 112).

Referring to equation (2), in Step 113, the calibration curve (Use Comp curve) is computed by (1) subtracting the Base Comp curve (Curve 0) value at the given Reynolds Number from 1 (1−Base Comp); (2) multiplying the difference by the computational factor determined in Step 112; and (3) adding the product to the Base Comp curve (Curve 0) value at the given Reynolds Number. The process is performed for multiple Reynolds Numbers to plot the calibration curve with the plot points shown in the Use Comp column of Table 3. The calibration factor is retrieved by determining the value of the calibration curve at a given Reynolds Number (Step 114).

Figure 3:
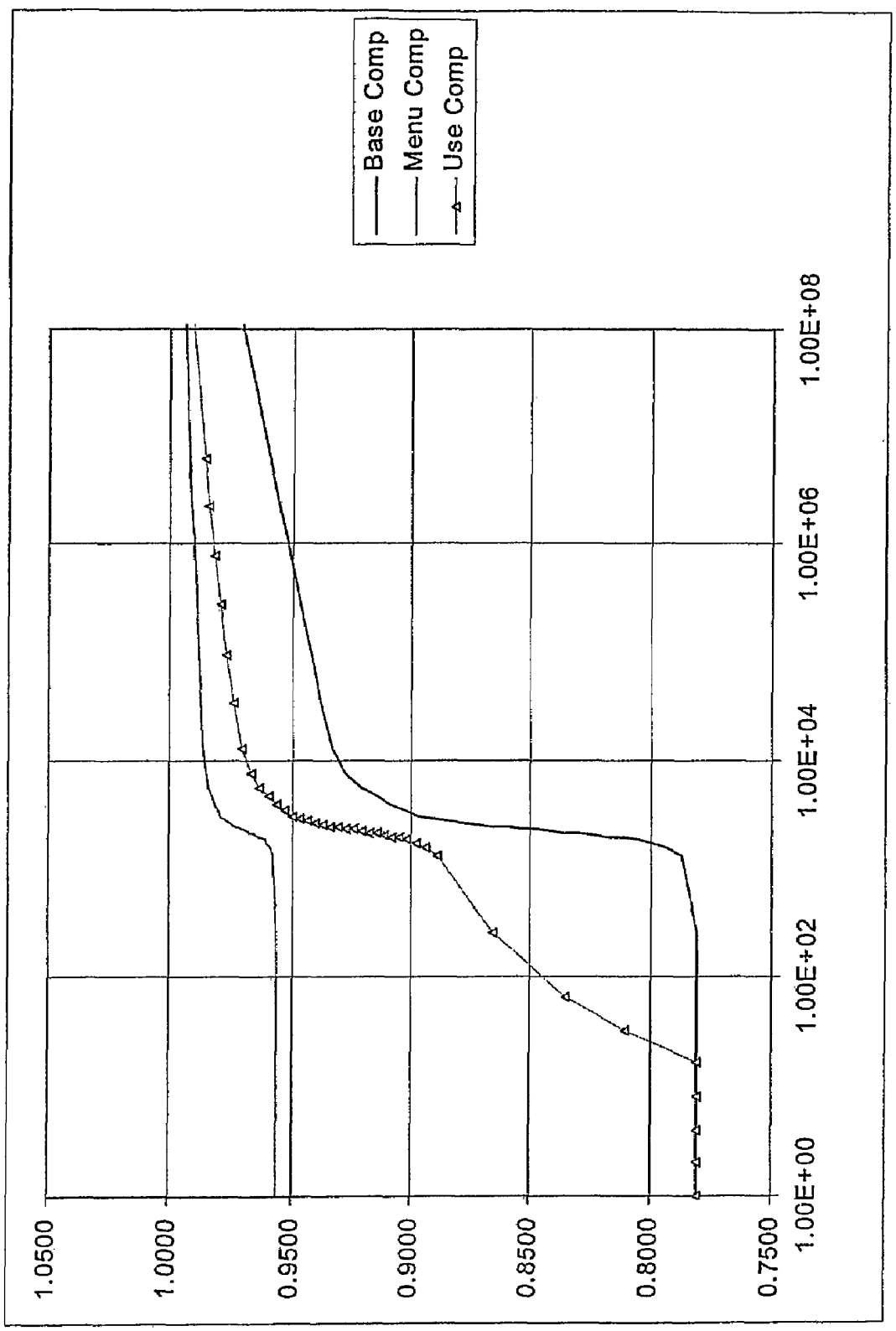
FIG. 3 shows a chart of initial, fully developed and calibration curves, according to an embodiment of the present invention.

Referring to FIG. 3, a plot of a calibration curve for a "pipe size reduction" is shown wherein the swirl factor is 1, the Initial Curve is Curve 8, and the installation of the transducer is 10 pipe diameters downstream from the reduction. As shown in FIG. 3, the upper curve (Menu Comp) is the initial curve, which is Curve 8 from FIG. 1. The lower curve (Base Comp) is curve 0 from FIG. 1. The middle curve (Use Comp) curve is computed from the method described in connection with FIGS. 4A and 4B and equation (2) to give the calibration factor for a given Reynolds number. Note that at the lower Reynolds numbers, the flow profile is fully developed, and the Use Comp curve merges with the fully developed (Base Comp) curve. At all other points, a calibration factor represents a dynamically changing shape of a flow profile that exists at, for example, 10 diameters downstream from the anomaly (e.g., pipe size reduction) that is initially represented best by a curve 8 condition, and is not yet Fully Developed.

A flowmeter is designed to utilize and implement the above system and method so as to produce an accurate calibration factor for calibrating the flowmeter. For example, the system and methods described herein are applicable to the calibration of clamp-on flowmeters, such as ultrasonic flowmeters.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for calibrating a flowmeter, comprising:
    choosing at a processor a pipe configuration from a list of pipe configurations;
    defining at the processor a number of diameters downstream from the pipe configuration where a transducer is to be installed; and
    determining at the processor a number of diameters required to convert a fluid flow from a flat flow profile to a fully developed flow profile based on a Reynolds number of the pipe configuration.

2. The method as recited in claim 1, wherein the step of determining is performed according to the equation y=4.3429 Ln(x)+4E−14, where y=the number of diameters to convert the fluid flow from the flat flow profile to the fully developed flow profile, and x=Reynolds number.

3. The method as recited in claim 1, further comprising determining at the processor an initial curve number for the chosen pipe configuration.

4. The method as recited in claim 3, wherein the initial curve number corresponds to a predetermined flow profile correction curve.

5. The method as recited in claim 3, wherein the initial curve number is determined from a list of pipe configurations including respective predetermined initial curve numbers assigned to each listed pipe configuration.

6. The method as recited in claim 1, further comprising:
    determining by the processor a swirl factor for the chosen pipe configuration; and
    multiplying by the processor the swirl factor by the number of diameters required to convert the fluid flow from the flat flow profile to the fully developed flow profile.

7. The method as recited in claim 6, wherein the swirl factor is determined from a list of pipe configurations including respective swirl factors assigned to each listed pipe configuration.

8. The method as recited in claim 3, further comprising:
    dividing at the processor the number of diameters downstream from the pipe configuration where the transducer is to be installed by the number of diameters required to convert the fluid flow from the flat flow profile to the fully developed flow profile;
    multiplying at the processor a result of the division by ten; and
    subtracting at the processor a result of the multiplication from the initial curve number.

9. The method as recited in claim 8, further comprising using a fully developed flow profile correction curve to determine at the processor a calibration factor if the result of the subtraction is less than or equal to 0.

10. The method as recited in claim 8, further comprising:
    dividing at the processor the result of the subtraction by 10 to compute a computational factor if the result of the subtraction is greater than 0;
    computing at the processor a calibration curve; and
    determining at the processor a calibration factor by finding a point on the calibration curve corresponding to a given Reynolds number.

11. The method as recited in claim 10, wherein computing the calibration curve comprises:
    (a) subtracting at the processor a value of a fully developed flow profile correction curve at a given Reynolds number from 1,
    (b) multiplying at the processor the difference by the computational factor and
    (c) adding at the processor the product to the value of the fully developed flow profile correction curve at the given Reynolds number; and
    repeating steps (a)-(c) at the processor for a plurality of Reynolds numbers.

12. A method for calibrating a flowmeter, comprising:
    choosing at a processor a pipe configuration from a list of pipe configurations;
    defining at the processor a number of diameters downstream from the pipe configuration where a transducer is to be installed;
    determining at the processor an initial curve number for the chosen pipe configuration, wherein the initial curve number corresponds to a predetermined flow profile correction curve; and
    determining at the processor a swirl factor for the chosen pipe configuration.

13. The method as recited in claim 12, further comprising computing at the processor a calibration factor for a given Reynolds number by implementing the following equation:

CF=Base Comp+(1−Base Comp)*Max [0,IC−Diameters/(SF*(4.3429* Ln(RN)+0.00000000000004))*10]/10 wherein, CF is the calibration factor, Base Comp is a point on a fully developed flow profile correction curve for the given Reynolds Number (RN), IC is the initial curve number, SF is the swirl factor, Diameters is the number of diameters downstream from the pipe configuration where the transducer is to be installed, and Max [ . . . ] represents the maximum of the two parameters in the brackets, wherein the two parameters are 0 and IC−Diameters/(SF*(4.3429*Ln(RN)+0.00000000000004))*10.

14. A flowmeter calibrated according to the method of claim 12.

15. A machine-readable medium having instructions stored thereon for execution by a processor to perform a method for calibrating a flowmeter, the method comprising:
    choosing a pipe configuration from a list of pipe configurations;
    defining a number of diameters downstream from the pipe configuration where a transducer is to be installed; and
    determining a number of diameters required to convert a fluid flow from a flat flow profile to a fully developed flow profile based on a Reynolds number of the pipe configuration.

16. The machine-readable medium as recited in claim 15, wherein the step of determining is performed according to the equation y=4.3429 Ln(x)+4E−14, where y=the number of diameters to convert the fluid flow from the flat flow profile to the fully developed flow profile, and x=Reynolds number.

17. The machine-readable medium as recited in claim 15, wherein the method further comprises instructions for determining an initial curve number for the chosen pipe configuration.

18. The machine-readable medium as recited in claim 17, wherein the initial curve number corresponds to a predetermined flow profile correction curve.

19. The machine-readable medium as recited in claim 17, wherein the initial curve number is determined from a list of pipe configurations including respective predetermined initial curve numbers assigned to each listed pipe configuration.

20. The machine-readable medium as recited in claim 15, wherein the method further comprises:
determining a swirl factor for the chosen pipe configuration; and
multiplying the swirl factor by the number of diameters required to convert the fluid flow from the flat flow profile to the fully developed flow profile.

21. The machine-readable medium as recited in claim 20, wherein the swirl factor is determined from a list of pipe configurations including respective swirl factors assigned to each listed pipe configuration.

22. The machine-readable medium as recited in claim 17, wherein the method further comprises:
dividing the number of diameters downstream from the pipe configuration where the transducer is to be installed by the number of diameters required to convert the fluid flow from the flat flow profile to the fully developed flow profile;
multiplying a result of the division by ten; and
subtracting a result of the multiplication from the initial curve number.

23. The machine-readable medium as recited in claim 22, wherein the method further comprises using a fully developed flow profile correction curve to determine a calibration factor if the result of the subtraction is less than or equal to 0.

24. The machine-readable medium as recited in claim 22, wherein the method further comprises:
dividing the result of the subtraction by 10 to compute a computational factor if the result of the subtraction is greater than 0;
computing a calibration curve; and
determining a calibration factor by finding a point on the calibration curve corresponding to a given Reynolds number.

25. The machine-readable medium as recited in claim 24, wherein computing the calibration curve comprises:
(a) subtracting a value of a fully developed flow profile correction curve at a given Reynolds number from 1,
(b) multiplying the difference by the computational factor and
(c) adding the product to the value of the fully developed flow profile correction curve at the given Reynolds number; and
repeating steps (a)-(c) for a plurality of Reynolds numbers.

26. A machine-readable medium having instructions stored thereon for execution by a processor to perform a method for calibrating a flowmeter, the method comprising:
choosing a pipe configuration from a list of pipe configurations;
defining a number of diameters downstream from the pipe configuration where a transducer is to be installed;
determining an initial curve number for the chosen pipe configuration, wherein the initial curve number corresponds to a predetermined flow profile correction curve; and
determining a swirl factor for the chosen pipe configuration.

27. The machine-readable medium as recited in claim 26, wherein the method further comprises computing a calibration factor for a given Reynolds number by implementing the following equation:

$$CF = \text{Base Comp} + (1-\text{Base Comp})*\text{Max}[0, IC-\text{Diameters}/(SF*(4.3429* Ln(RN)+0.00000000000004))*10]/10$$

wherein, CF is the calibration factor, Base Comp is a point on a fully developed flow profile correction curve for the given Reynolds Number (RN), IC is the initial curve number, SF is the swirl factor, Diameters is the number of diameters downstream from the pipe configuration where the transducer is to be installed, and Max [ . . . ] represents the maximum of the two parameters in the brackets, wherein the two parameters are 0 and IC−Diameters/(SF*(4.3429*Ln(RN)+0.00000000000004))*10.

* * * * *